March 4, 1924.

D. L. WINTERS

CARBURETOR

Filed Oct. 13, 1921

Inventor
David L. Winters

By Brown & Phelps

Attorneys

March 4, 1924.
D. L. WINTERS
CARBURETOR
Filed Oct. 13, 1921
1,485,658
2 Sheets-Sheet 2
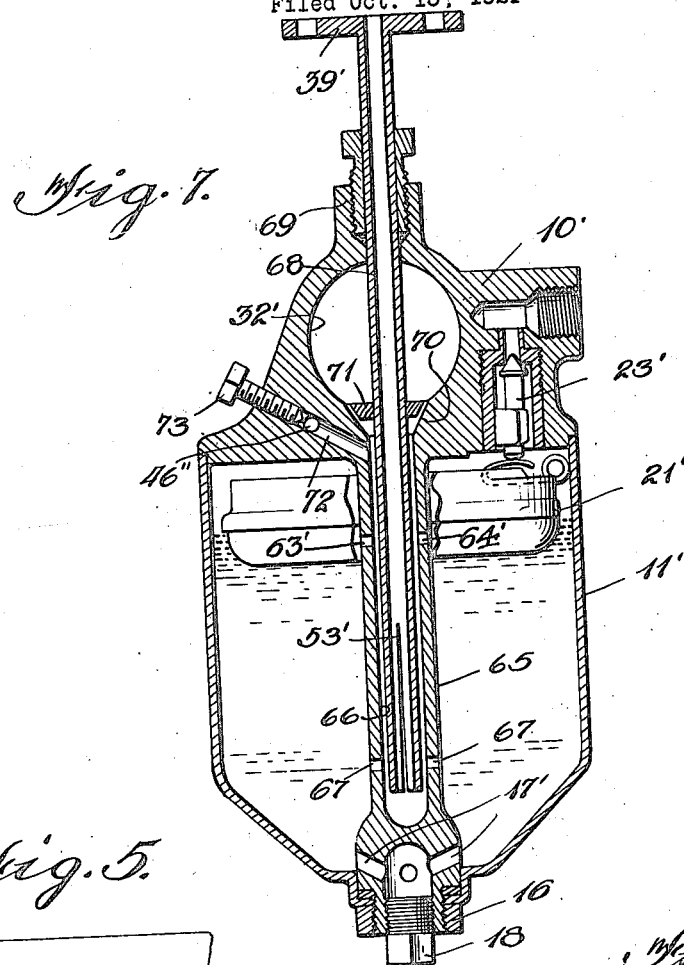
Inventor
David L. Winters
By Brown & Phelps
Attorneys Patented Mar. 4, 1924.

1,485,658

UNITED STATES PATENT OFFICE.

DAVID L. WINTERS, OF PHILADELPHIA, PENNSYLVANIA.

CARBURETOR.

Application filed October 13, 1921. Serial No. 507,425.

*To all whom it may concern:*

Be it known that I, DAVID L. WINTERS, a citizen of the United States, residing at Philadelphia, in the county of Philadelphia and State of Pennsylvania, have invented certain new and useful Improvements in Carburetors, of which the following is a specification.

This invention relates to carburetors and has as an object the provision of a carburetor which is more uniformly efficient at all speeds and more simple to construct than carburetors now in use.

An illustrative embodiment of the invention is shown in the accompanying drawings, in which—

Fig. 1 is a vertical central section on line 1—1 of Fig. 2;

Fig. 2 is a plan view;

Fig. 3 is a detail section on line 3—3 of Fig. 2, showing the Venturi tube and adjacent parts;

Fig. 4 is a detail section on line 4—4 of Fig. 3;

Fig. 5 is a detail section showing a modification of the idling jet.

Fig. 6 is a detail section of a modified form of air tube in the fuel well; and

Fig. 7 is a central vertical section of a modified form of carburetor.

Many of the carburetors now in use upon internal combustion engines have jets or other parts projecting into the Venturi tube which offer objectionable obstructions to flow of air therethrough. Also the idling jets are not so arranged as to properly graduate the richness of the mixture during the initial opening of the throttle valve through and just beyond the idling range. Moreover the richness of the mixture at idling and low engine speeds is not commonly properly determined through failure to recognize the fact that the actual richness of mixture at any speed is dependent upon the fuel placed in the charge in such atomized or volatilized condition as to be combustible at that speed rather than by the total amount of fuel in the charge much of which may be in liquid form in droplets too large to function as a portion of the explosive mixture and much of which may adhere to the inner surface of the intake manifold. Moreover no carburetor of which I am at present aware admits air into the fuel for purposes of atomizing the same in a proportion varying directly with the speed of the air passing the smallest portion of the Venturi tube.

A usual means of controlling the flow of fuel to the Venturi tube is by means of a needle valve acting upon the liquid fuel itself. Such a control must be closed so that the passage for fuel is exceedingly small, which is objectionable for two reasons: first, because the exceedingly small passage is liable to stoppage and, second, because an adjustment which can be made by a practical screw thread forms so large a percentage of the exceedingly small opening as to make it almost impossible to obtain the correct adjustment. The means for permitting the flow of fuel, which is described below, will never be completely closed. Any change made in the adjustment thereof will be only a small increment of the total opening of the fuel passage.

Exhaustive experiments have shown that the greatest fuel efficiency is obtained with about one part of gasoline and sixteen parts of air by weight while the greatest engine power is obtained with about one part gasoline and twelve parts of air by weight. Therefore it is desirable to have the admission of the fuel to the air supply so fixed that it can not be increased beyond the maximum named, and may be adjusted by the user so as to be as low if desired as the minimum named. Means to provide such working will be described.

The carburetor shown in the drawings comprises a block 10 having a bowl 11 seated upon a shoulder 12 formed thereon. Integral with the block 10 there is provided a projection 13 having a screw threaded portion 14 at its lower end adapted to pass through an opening in the bowl, a gasket 15 being supplied between the parts. The bowl is retained in place upon the block 10 by means of a nut 16. Drain openings 17 are provided in the bottom of the casting which may be opened by means of removal of a plug 18 to drain the bowl of any sediment therefrom. Fuel is admitted to the carburetor through an opening 19 which is tapped for attachment of a fuel pipe, and its flow is controlled by means of a needle valve 20 controlled by a float 21, pivoted at 22, and bearing against the needle valve at 23.

A main air passage 24 extends through the block 10 and a flange 25 for attachment to the intake manifold of an engine is provided at one end of the block and a coupling 26 for attachment to a hot air pipe is provided at the other end of the block.

An automatic choke which forms the subject of a Patent No. 1,347,199, granted to myself July 20, 1920, is shown in the main passage 24, and comprises a block 27 obstructing a portion of the passage, and a butterfly valve 28 adapted to close the remaining portion of the passage, the valve being longer upon one side than upon the other will tend to swing open under suction of the engine and to allow the valve to automatically open to an extent dependent upon the amount of the suction, a slight spring 29 is placed between the end of the choke valve lever 30 and the choke rod 31, which latter preferably extends to within reach of the operator of the engine.

The Venturi tube 32 is shown as formed separate from the main air passage and as being retained therein by means of a set screw 33. To admit a rich mixture of air and fuel to the air passing through the Venturi tube an annular passage 35 is provided at a point slightly above the smallest section of the Venturi tube, and a plurality of jets, two being shown, 36 and 37, are provided connecting the passage 35 with the interior of the venturi. One of the jets, as 36, may be formed of such a size as will, when used alone, provide a mixture of fuel and air in proportion of substantially sixteen parts of air to one part of fuel by weight. The other jet, as 37, may be of such a size as when unrestricted and working with jet 36, will provide a mixture of substantially twelve parts of air to one part of fuel by weight. To adjust the amount of rich mixture which is allowed to pass through the jet 37 a needle 38 may be screwed into the block 10 and may be controlled by turning a disk 39. If desired means for turning the disk 39 may be extended to a position within reach of the operator of the engine.

It will be understood that the jet 36, shown in Fig. 1, may be omitted, and that the orifice 37 may, if desired, be made sufficiently large to admit, when unobstructed, an amount of fuel sufficient to provide the richest desired mixture, say a proportion of one part of fuel to twelve parts of air by weight. By use of the screw 38 this orifice can then be restricted so as to actually get what will be secured by use of both orifices as shown but with a possibility of a wrong adjustment which will get too lean a mixture, a condition which is not possible with the use of the two orifices, as shown in the preferred construction.

In Fig. 3 is shown a desirable form of idling jet in which fuel is admitted through a passage 46 shown as connected with the annular passage 35 which is in communication with the fuel well 49. If desired the tube 46 could be connected with the gasoline in the bowl 11, directly, or with the gasoline in the well 49 at any other point than that shown. About the opening of the tube 46 into the main air passage a depression 48 is formed which opens into the main air passage adjacent the edge of the throttle valve 42 when opened to its idling position. As shown in this figure, the depression will allow air to escape around the throttle valve, drawing fuel through the tube 46 in its passage, and as the throttle valve is opened slightly the increased escape of air about the edge thereof will increase the suction upon the tube 46 by an amount graduated directly as the movement of the valve. This will provide a suction gradually increasing to draw an amount of fuel to mix with the increasing amount of air to give a substantially uniformly rich charge rather than a sudden change of richness, as provided by usual practice. An adjusting screw 47 is shown to vary the amount of fuel admitted.

The usual form of throttle valve allows air to pass by both sides thereof when the valve is slightly open, and an idling jet is usually provided at one side only. The results of this practice are twofold: first, a slight movement of the valve provides an undesirably large change in the amount of air passed, and second, the idling jet is acted upon by only half of the air which passes the throttle. To permit air to pass only one side of the throttle valve in its initial opening the valve provided by the present invention is shown housed in the passage with an obstruction at one side which is formed upon a zone of a sphere so as to lie closely adjacent the edge of the valve during its initial movement. This is brought about as shown in Fig. 3 by placing the valve 42 adjacent the end of the Venturi tube and forming the tube with a surface 40 formed upon the arc of a circle swept by the valve in its initial movement. Only the side of the valve to the right in Fig. 3 will therefore allow air to pass until after the other edge of the valve has passed the point 41 in said figure. The rich mixture of the air and fuel from the annular passage 35 is allowed to pass the throttle valve by means of a passage 43 opening at the jet 44, and which passage may be adjusted by means of a screw 45.

A modified form of idling jet is shown in Fig. 5 which may be used as there shown or in conjunction with a jet such as 44 in Fig. 3. The form of Fig. 5 shows the Venturi tube integral with the block 10 and lacks the spherical surface coacting with the edge of the valve 42 during its initial movement.

The depression 48' in this form will allow air to escape about the edge of the valve as it is opened, drawing fuel with it as in the form of Fig. 3. The increased air as the valve opens will be accompanied by an increase of fuel as in the form of Fig. 3.

During the idling action of the carburetor air will be drawn in through the jets 36—37 to the annular passage to unite with the rich mixture of fuel which is fed to the passage 35, and will therefore reduce the richness of this mixture in case the throttle valve is closed too tightly, and tend to prevent stalling of the engine during idling.

As an engine gathers speed the air passing through the Venturi tube of the usual form with the obstructions to air which are often present tends to become rarefied, which fact, together with the fact that the rarefaction itself places greater suction upon the fuel, tends to produce a rich mixture at the higher speeds when a leaner mixture could be used to advantage than under low engine speeds because of the greater atomizing efficiency of the higher velocities. Even without obstructions in the venturi, as provided in the structure herein shown, air will be rarefied to some extent as its velocity increases, because of the skin friction in the passage and in any air heater provided for the engine. It is desirable to have the supply of fuel to the air in the main air passage substantially in direct proportion at all times to the speed of the air through the passage. To supply such a mixture, fuel is allowed to stand in a fuel well 49 up to the level of the fuel in the bowl 11. Within the well 49 a tube 50 is provided which extends outside of the block 10 and is adjustably held thereby by means of screw threads, as at 51. The passage within the tube 50 is in open communication with the atmosphere as by passage 52.

To admit air from the tube 50 into the fuel in the tube and pick it up and form a rich mixture and carry it to the annular passage 35 a slot 53 is shown in one side of the tube 50, the opening of the slot being slightly below the normal level 54 of the fuel in the well 49. The passage of the air through the Venturi tube to jets 36, or the idling jet 44, will produce a current of air through the tube 50, which will depress the level of liquid therein until the air escapes through the slot 53, which air will carry fuel with it, causing the fuel to become thoroughly atomized before it reaches the passage 35. As the velocity of the air in the Venturi tube increases, the flow of air through the tube 50 will increase at a rate directly proportional thereto, and consequently lower the level of the fuel in the well 49 and in the interior of the tube 50 to allow the amount of air drawn to pass, the increased head of the liquid insuring that an amount of fuel in direct proportion to the amount of air passing will be picked up.

At low engine speeds the velocity of flow of the air through the slot 53 will be at its minimum and atomization will therefore be less perfect than at higher velocities. Since the actual richness of the mixture fed to the motor depends upon the amount of fuel which is present in such a state of atomization that it can be burned, a larger proportional amount of fuel must be fed at slow engine speeds to produce the desired richness of mixture. For this reason the slot is brought to substantially a point at its upper end so as to decrease the level of liquid in the feed tube at a greater rate during the low speeds. The increase of atomizing power of the air with increasing velocity will continue throughout the increase of engine speed, and therefore in order to produce a proportionate increase of supply of fuel and air to maintain an equal richness at all velocities more air must be admitted through the slot 53 as the velocity increases. To produce an actual proportional increase the sides of the slot are made out of parallel, as shown, being wider at the bottom. To make the width of the slot 53 adjustable so that its rate of variation of fuel supply may be adjusted the slot is preferably made wider at its lower end initially, and set screws 55—56 are provided in the walls of the member 13 which, upon being screwed in may press the sides of the slot together. It may be desired at some one point of engine speed, say at the speed of the engine at which the user desires maximum power in climbing a hill, to provide a mixture slightly richer in proportion than that provided at other engine speeds. This contingency may be met by providing a curve in the walls of the slot, as shown at 57—58 in Fig. 6. The lower end of the well 49 is shown as provided with a plug 59, having an opening 60, which will allow fuel to pass, under the head of the fuel in the bowl 11, only so fast as the maximum output of the carburetor is intended to be. Therefore when the air has lowered the level of the liquid in the well 49 to the lower end of the tube 50, the fuel will flow in through the passage 60 only as fast as it is used. A lever 61 is shown to control the throttle 42, and a stop 62 to limit the closing action of the throttle.

When an engine is running with a supply of fuel delivered by the carburetor illustrated, at such a speed as to reduce the level of the fuel to the bottom end of the tube 50 and is suddenly throttled to idling position of the throttle the idling jets shown in Fig. 1 would have no supply of fuel for the length of time taken for the fuel to enter the opening 60 and rise in the tube. To overcome this objection minute openings 63—64 may be provided in the walls of the fuel well slightly below the normal liquid level in the bowl. These openings will admit an amount of fuel under a fixed head which will not interfere in any way with the action of the well nor the measured amount of fuel which flows through the opening 60, the opening 60 merely being made as much smaller as required, taking into consideration the amount of fuel which will flow through the openings 63—64. The fuel falling in through the small openings 63—64 will meet the air passing upwardly which enters through the slot 53 and will be carried with it and supply the idling jets until the well has again become filled by inflow through the opening 60.

A modification of the invention is shown in Fig. 7, wherein the casting 10′ has a downwardly projecting portion 65 which may be cast integral therewith, or may be secured thereto and within which the fuel well 66 is formed. Provision for the fuel to enter the well 66 at a measured rate is shown in the form of an opening, or openings 67, two being shown.

The bowl 11′ is secured to the portion 65 by means of a nut 16′ coacting with a threaded projection on said portion 65 and drain openings 17′ are formed similar to those shown in Fig. 1, a drain plug 18′ being provided in the bottom of the opening. The float 21′ and the needle valve 23′ are similar to those provided in the modification of Fig. 1. To admit air to the fuel well 66 a tube 68 is shown as threaded into the upper portion of the block 10′ at 69, being adjustable therein, and as carrying the slot 53′ in its lower portion, which slot is preferably formed tapered as already described in connection with the modification of Fig. 1. To admit the rich mixture of fuel and air formed by coaction of the slot 53′ with the fuel in the well 66 to the Venturi tube 32′, an opening 70 is provided about the tube 68 where it passes through the passage into the well 66. To adjust the opening 70 and thereby the rate of flow of the rich mixture of air and fuel into the venturi 32′ a valve member 71 in the form of a collar with a tapered lower surface is shown secured to the tube 68. The upper end of the tube 68 is freely open to the atmosphere for admission of the air to form the rich mixture with the fuel in the well 66. The tube may be adjusted by turning the disk 39′ in the manner already described in connection with the modification of Fig. 1. Auxiliary ports 63′, 64′ are provided in the form of the invention with the same function as described for the ports 63, 64, Fig. 1.

A passage is shown at 46″ which coacts with an idling jet such as shown at 48′ in Fig. 5. A passage 72 is shown placing the passage 46″ in communication with the well 66. In order to form the passage 72 it is necessary to drill from the exterior block 10, and the opening thus formed is utilized for reception of an adjusting valve 73 to control the amount of flow of the rich mixture through the idling jet.

The operation of the form of the device of Fig. 1 is as follows: The suction caused by the action of the motor causes air to be drawn through the Venturi tube 32, which stream of air, when the butterfly valve 42 is open will induct air through jets 36 and 37 from the annular space about the tube 50. In order to reach the annular space, air passing in through passage 54 must depress the gasolene in the tube 50 from the initial level 54 to the top of the slot 53 thereby picking up some of the liquid in atomized condition.

The slot 53 widens downwardly and is so proportioned that the volume of air drawn will always somewhat depress the liquid at all engine speeds. Should the fuel be used as fast as it can be admitted through openings 60 and the throttle be suddenly closed with substantially no fuel in the well 13 the engine would stall before the well could again be filled. The openings 63, 64 are provided to avoid the contingency.

The jet 36 provides a minimum supply of fuel in amount to give the most economical running and jet 36 plus the full opening of 37 gives fuel for greatest power while adjustment needle 38 provides for any desired compromise. The spacing of the top of slot 53 below level 54 may be determined by screwing the tube 50 in or out and the taper of slot 53 may be adjusted by screws 56.

Idling jets 44 and 48 are designed to provide a substntially uniform or slightly increased richness of fuel-air mixture during initial movements of the throttle with a constant supply of fuel and air through jet 44 when the throttle is entirely closed. The latter function is attained by the mixture of fuel and carrying air from the fuel well and additional air which enters through ports 36, 37. When the throttle is started toward open position the jet 48 is uncovered while the amount of air passing this side of the valve is checked by the surface 40.

Minor changes may be made in the physical embodiment of the invention without departing from its spirit.

I claim:

1. A carburetor comprising, in combination, a gravity fed fuel well, a main air passage, a passage connecting said well and air passage, means to admit air to said well comprising a tube in said well having a longitudinal slot with its upper end adjacent the normal liquid level in said well, means to admit air to said tube.

2. A carburetor comprising, in comibnation, a gravity fed fuel well, a main air passage, a passage connecting said well and air passage, means to admit air to said well comprising a tube in said well having a tapered longitudinal slot with its upper end adjacent the normal liquid level in said well, means to admit air to said tube.

3. A carburetor comprising, in combination, a gravity fed fuel well, a main air passage, a passage connecting said well and air passage, means to admit air to said well comprising a tube in said well having a longitudinal slot with its upper end adjacent the normal liquid level in said well, means to admit air to said tube, and means to adjust the width of said slot.

4. A carburetor comprising, in combination, a gravity fed fuel well, a main air passage, a passage connecting said well and air passage, means to admit air to said well comprising a tube in said well having a tapered longitudinal slot with its upper end adjacent the normal liquid level in said well, means to admit air to said tube, and means to adjust the width of said slot.

DAVID L. WINTERS.